(12) United States Patent
Talia et al.

(10) Patent No.: US 9,274,841 B2
(45) Date of Patent: Mar. 1, 2016

(54) SYSTEM FOR ENERGY SAVING IN COMPANY DATA CENTERS

(75) Inventors: Domenico Talia, Rende (IT); Carlo Mastroianni, Rende (IT); Agostino Forestiero, Rende (IT); Giuseppe Papuzzo, Rende (IT); Raffaele Giordanelli, Rende (IT)

(73) Assignees: CONSIGLIO NAZIONALE DELLE RICERCHE, Rome (IT); UNIVERSITA DELLA CALABRIA, Arcavacata di Rende (IT)

( * ) Notice: Subject to any disclaimer, the term of this patent is extended or adjusted under 35 U.S.C. 154(b) by 96 days.

(21) Appl. No.: 14/237,316

(22) PCT Filed: Aug. 8, 2012

(86) PCT No.: PCT/IT2012/000248
§ 371 (c)(1),
(2), (4) Date: Mar. 6, 2014

(87) PCT Pub. No.: WO2013/021407
PCT Pub. Date: Feb. 14, 2013

(65) Prior Publication Data
US 2014/0173601 A1    Jun. 19, 2014

(30) Foreign Application Priority Data
Aug. 10, 2011   (IT) .............. RM2011A0433

(51) Int. Cl.
G06F 9/455 (2006.01)
G06F 9/50 (2006.01)
(52) U.S. Cl.
CPC .......... *G06F 9/5016* (2013.01); *G06F 9/45533* (2013.01); *G06F 9/5072* (2013.01); *Y02B 60/142* (2013.01); *Y02B 60/146* (2013.01); *Y02B 60/167* (2013.01)

(58) Field of Classification Search
CPC ................................... G06F 9/45533
USPC ............................................ 718/1
See application file for complete search history.

(56) References Cited

U.S. PATENT DOCUMENTS

| | | | |
|---|---|---|---|
| 6,078,960 A * | 6/2000 | Ballard | 709/229 |
| 8,537,673 B1 * | 9/2013 | Venkatesan | 370/230.1 |
| 8,635,328 B2 * | 1/2014 | Corley et al. | 709/224 |
| 2005/0108709 A1 | 5/2005 | Sciandra et al. | |
| 2009/0150700 A1 * | 6/2009 | Dell'Era | 713/324 |

(Continued)

FOREIGN PATENT DOCUMENTS

| | | |
|---|---|---|
| EP | 2487837 | 8/2012 |
| JP | 2011082799 | 4/2011 |
| WO | 2007/063132 | 6/2007 |

OTHER PUBLICATIONS

Agostino Forestiero et al: "Towards a Self-structured Grid: An Ant-Inspired P2P Algorithm", Jan. 1, 2008, Transactions on Computational Systems Biology X, Springer Berlin Heidelberg, pp. 1-19, XP019140449, ISBN: 978-3-540-92272-8.

(Continued)

*Primary Examiner* — Ted T Vo
*Assistant Examiner* — Lanny Ung
(74) *Attorney, Agent, or Firm* — Steinfl & Bruno LLP

(57) ABSTRACT

Assigning of application-hosting virtual machines to a plurality of servers inclusive of active and inactive servers in a data or calculation center is described.

20 Claims, 2 Drawing Sheets

(56) References Cited

U.S. PATENT DOCUMENTS

| | | | |
|---|---|---|---|
| 2010/0100938 A1* | 4/2010 | Ramic et al. ............. | 726/4 |
| 2011/0010709 A1 | 1/2011 | Anand et al. | |
| 2011/0154327 A1* | 6/2011 | Kozat et al. ............. | 718/1 |

OTHER PUBLICATIONS

Agostino Forestiero et al: "A Proximity-Based Self-Organizing Framework for Service Composition and Discovery", Cluster, Cloud and Grid Computing (CCGRID), 2010 10th IEEE/ACM International Conference on, IEEE, Piscataway, NJ, USA, May 17, 2010, pp. 428-437, XP031695790, ISBN: 978-1-4244-6987-1.

Oracle of May (http://www.cwi.it/it-fai-da-te-gli-utenti-sono-pronti-2350#more-2350); retrieved on Mar. 24, 2014, translated by Google Chrome (Italian to English).

International Search Report mailed on Jan. 30, 2013 for PCT/IT2012/000248 filed on Aug. 8, 2012 in the name of Consiglio Nazionale Delle Ricerche.

International Preliminary Report on Patentability mailed on Nov. 7, 2013 for PCT/IT2012/000248 filed on Aug. 8, 2012 in the name of Consiglio Nazionale Delle Ricerche.

Anton Beloglazov, et al. "A Taxonomy and Survey of Energy-Efficient Data Centers and Cloud Computing Systems." Advances in Computers 82: 47-111 (2011).

Rajkumar Buyya, et al. "Cloud Computing and Emerging IT Platforms: Vision, Hype, and Reality for Delivering Computing as the 5$^{th}$ Utility." Future Generation Computer Systems, 25(6):599-616, Jun. 2009.

Anton Beloglazov, et al. "Energy Efficient Allocation of Virtual Machines in Cloud Data Centers." In 10$^{th}$ IEEE/ACM Int. Symp. On Clustser Computing and the Grid, CCGrid 2010, pp. 577-578, 2010.

Luiz Andre Barroso, et al. "The Case for Energy-Proportional Computing." IEEE Computer, 40(12):33-37, Dec. 2007.

Albert Greenberg, et al. "The Cost of a Cloud: Research Problems in Data Center Networks." SIGCOMM Comput. Commun. Rev., 39(1): 68-73, 2009.

Akshat Verma, et al. "pMapper: Power and Migration Cost Aware Application Placement in Virtualized Systems." In Valrie Issarny and Richard E. Schantz, editors, Middleware 2008, ACM/IFIP/USENIX 9$^{th}$ International Middleware Conference, Leuven, Belgium, Dec. 1-5, 2008, Proceedings, vol. 5346 of Lecture Notes in Computer Science, pp. 243-264. Springer, 2008.

M. Stillwell, et al. "Resource Allocation using Virtual Clusters." In: Proceedings of the 9$^{th}$ IEEE/ACM International Symposium on Cluster Computing and the Grid (CCGrid 2009), Shanghai, China, 2009, pp. 260-267.

Minyi Yue, et al. "A Simple Proof of the Inequality FFD (L)≤11/9 OPT (L)+1, for all L for the FFD bin-packing algorithm." Acta Mathematicae Applicatae Sinica, 7(4):321-331, 1991.

Michele Mazzucco, et al. "Maximizing Cloud Providers' Revenues via Energy Aware Allocation Policies." In 10$^{th}$ IEEE/ACM Int. Symp. On Cluster Computing and the Grid, CCGrid 2010, pp. 131-138, 2010.

\* cited by examiner

SYSTEM FOR ENERGY SAVING IN COMPANY DATA CENTERS

CROSS REFERENCE TO RELATED APPLICATIONS

The present application is the US national stage of International Patent Application PCT/IT2012/000248 filed on Aug. 8, 2012 which, in turn, claims priority to Italian Patent Application RM2011A000433 filed on Aug. 10, 2011.

The present invention concerns a system for energy saving in company data center.

More in detail, the present invention regards a method of assignment of computational load to the different servers of a data center by means of virtual machines ("Virtual Machine", VM), aimed at reducing the energy consumed in the data center, maintaining at the same time an appropriate service level for the clients of the same data center.

The advent of Cloud Computing is representing a radical perspective change in the management of the informatics infrastructures for companies of any dimensions and for the scientific communities [Buy09]. The main advantage for the companies is that it is not necessary anymore to manage an own data center, with corresponding costs and administration burdens, but it is possible to entrust data and computing to the "cloud", i.e. to pay services offered by data centers of specialized companies. For example, it is possible to perform a Web server on a Cloud instead of local computer, choice that implies remarkable advantages in terms of better guarantees of security and data availability (for example the defense from hackers is managed by professionals), and much smaller risks, if not zero risks, of underestimation or overestimation of the necessary resources.

Nevertheless, it is necessary to put attention to the problem of the energy saving in the data centers, due to the huge quantity of energy needed for feeding both servers themselves and cooling systems. It has been estimated that the consumed energy for the IT infrastructures are equal, in the only United States, to 120 billion of kWh, corresponding to about 3% of the total produced electric energy [Bel10]. The energy consumption obviously impacts both on the company's costs owning the data centers and on their clients, and has also a great environmental effect due to the $CO_2$ emissions.

The energy consumption is influenced by two important sources of inefficiency: on one side, on average, the servers are used only for the 20-30% of their capacity, determining a remarkable dispersion of resources [Bar07]. On the other side, a server with small load consumes about 70% of the power consumed by the same server with full load [Gre09].

The technique most used to relieve the problem is the "consolidation" of the applications, i.e. their collection on the smallest possible number of servers, so as to be able to deactivate or put in low consumption modality the not-used servers [Bel11]. The consolidation operation is possible thanks to the "virtualization": the applications are associated to virtual machines (VM), which can be executed concurrently on the same server, if this has the necessary resources, and can be "migrated" at runtime from one server to the other [Ver08, Bel10].

The problem of the optimal distribution of the VM to the server can be traced back to the problem of "bin packing", i.e. the allocation of a number of objects of variable dimensions (in our case VM with requests of heterogeneous load) to a minimum number of containers (in our case the server) [Ver08, Sti09]. Unfortunately, this is a NP-hard problem [Yue91], whose optimal solution needs an exponential time, and it is therefore impossible to be reached in a data center with tens or hundreds of servers. Algorithms have been devised that are able to arrive to sub-optimal solutions [Maz10, Ver08, Bel10], but that present some important disadvantages:

1) It deals with centralised solutions, i.e. solutions requiring that a central manager has information always updated about the single servers, what is obviously problematic in big and dynamic data centers such as the ones used for Cloud Computing;
2) The solutions require in general the concurrent reallocation of a remarkable number of VM, what can bring to a decay of performances and service level offered to the users;
3) In any case, the utilised heuristic techniques can only guarantee to maintain in activity a number of servers that is higher of about 20% than the minimum number of servers [Yue91].

The problem, which one wishes to solve, consists in the reduction of consumed energy in the data center, maintaining at the same time a suitable level of service offered to the clients of the data center itself. In the case of Cloud Computing application, indeed, this is necessary for respecting the contractual constraints with the clients.

The subject of energy consumption in the data centers will be dominant during the next years, in terms of both efficiency and control and management. The energy saving strategies will assume different forms, from the introduction green technologies—such as the water-cooling systems or other refrigerants at machines level—to the real-time management of the infrastructure, which permits to move the resources on the basis of work load.

Also the physical space occupied by the server has its influence. Today the companies tend to concentrate the server racks in a limited space, but this does increase the temperature and, as a consequence, the electricity bill for the cooling: according to Gartner, the tendency to crowd the racks will continue until all the 2012 and the top management will soon realize that the energy cost of the IT, today already high, is only a fraction of the one that will weight on budgets tomorrow. Gartner calculates that, in three years, the costs for energy for a server will be higher than the cost of the server itself. And with the actual growing trends, it is likely that the server operative costs will soon become equal to the capital ones. A rack of 40 kW could cost up to 5,400 dollars per server each year.

Here-hence the necessity of new data center, with cutting-edge design, for reducing both capital and operative costs and to obtain higher computing performances per kilowatt. Some solutions for reducing the energy consumption in the data center can be the use of cooling at rack and row level for equipments at higher density, that can reduce the consumption until 15%, whereas dimensioning of the data center on the basis of its calculation needs, and expanding it only when necessary can cut down the operative costs in the long term by 10-30%.

The patent document WO2007063132 deals with virtual machine management on one or more servers. The intent is to monitor the session state on virtual machine environment for allowing the access to them by remote users. The states can be: active, pause, transition etc. A software of a virtual machine manager permits to monitor the sessions states and when, for example, a session proceeds too slowly, it is made migrating to another virtual machine. The patent document does not face the problem of the virtual machine assignment to more servers, apart from sessions and their state, so as to switch off as many servers as possible to save energy.

The patent US2005108709 face the problem of allocating a virtual machine group to several simultaneous clients that have the necessity to use these virtual machines. In the state-of-art, this is named virtual desktop allocation problem. In paragraphs [0007] and [0079], the document states that the virtual machines are distributed among the hosts by using a balance algorithm of the load so that "elaboration times are optimized". Now, optimising elaboration times is very different with respect to optimising the total consumption of the machines.

The patent document US2011010709 describes a method for optimising the system performances by using extra processing cores in a virtual environment. This method is not specifically designed for the energy saving and in any cases uses a deterministic approach (see paragraph [0006]), that doesn't appear adaptive and scalable.

The articles of Agostino Forestiero et al. "Towards a Self-structured Grid: An Ant-Inspired P2P Algorithm", 1 Jan. 2008, and Agostino Forestiero et al. "A proximity-based self-organizing framework for service composition and discovery", 17 May 2010 discloses algorithms in a framework of distributed Grid/P2P and in a public environment. The aim of the algorithms is to re-organise the resources to facilitate and to accelerate the search procedures, without reference to the energy saving during the use of the servers.

It is object of the present invention to provide a method for the assignment of computational loads among the servers of a data center, that solves the problems and overcomes the disadvantages of the prior art.

It is of additional specific aim of the present invention to furnish the equipment and the means necessary to realize the method aim of the present invention.

It is subject-matter of the present invention a method for the assignment of virtual machines hosting applications to servers of a plurality of servers in a data or calculation center, for the consolidation of said virtual machines, to each time instant said plurality of servers being subdivided in a subset of active servers, each hosting a certain number of virtual machines and a subset of inactive servers, the method being characterised in that it utilises a central manager ($\xi$) of the data center and a plurality of local managers in a number corresponding to that of the servers of said plurality of servers and in that, the following steps are executed:

S1. For at least a local manager relevant to said subset of active servers, carrying out individually a Bernoulli test on the basis of a probability function that depends on the occupation percentage of calculation resources of said at least a local manager and is null for occupation values of calculation resources of said at least a local manager higher than a pre-defined threshold, and declaring availability to accept or not the assignment of a new virtual machine, said central manager constructing a list of available servers on the basis of the availability of said at least a local manager;

The carrying out of the Bernoulli test is performed singularly for local managers, that is for the local servers, and can be done very well by the same local managers or by the central one instead of the local one once the latter has sent its state data to the central manager. Therefore, different embodiments are possible.

And in that, when there is a new virtual machine to be assigned to a server, said central manager:

S2. If said list of available servers contain at least an element, chooses, among the elements of said list, the server to which said new virtual machine is to be assigned, and assigns it to the former;

S3. If said list of available servers does not contain any element, activates a server in said subset of inactive servers and assigns to it said virtual machine to be assigned.

Once the servers have given their availability to accept a Virtual Machine (new or coming from another server after a migration), the choice of one of them could be simply random, or tied to other factors. For example, the central manager could choose the server that has the minor CPU occupation (or, better, higher, in the perspective of loading still more already loaded servers), the one that has the smallest memory occupation etc., the one that has been activated more recently o since more time etc. This generalization do not undermine in any manner the core innovative idea, that is to allow the single servers to decide as to whether providing availability, after a Bernoulli probabilistic test with true/false result. It has to be noted, in fact, that the central manager obligation to limit its decision to the server group that have declared to be available remains unchanged. It is this obligation that guarantees the scalable behavior of the algorithm. The additional possible criterion used to make the choice does not undermine the global behavior and the data center performances, but can be useful for satisfying secondary constraints, as a function of the needs and of the requests of the system administrators.

Preferably according to the invention, said at least a local manager of step S1 performs step S1 only after having controlled that some pre-determined conditions are satisfied, such as for example the fact that the occupation of the RAM memory or the use of the disks are below certain thresholds.

The availability of the single server to accept a Virtual Machine (new or coming from another server after a migration) could depend not only on the Bernoulli test but also on other constrains. For example, a server could verify at first if some constrains are satisfied (e.g. the occupation of the RAM memory, or the discs use, have to be under a certain threshold), and only if they are satisfied it would perform the Bernoulli test. If they are not satisfied, it would deny its availability immediately. Also this variation does not undermine the core innovative methodology. The effect of considering other constrains is only that of reducing the set of servers that will perform the Bernoulli test, and as a consequence the set of servers that will give their availability after the test. Nevertheless, the statistic/probabilistic nature of the algorithm remains unchanged and it remains the central manager obligation to decide among the server that have given their availability.

Preferably according to the invention, step S1 is performed subsequently to the following preliminary step:

S0. Said central manager broadcasts a request of availability to host said new virtual machine to be assigned to the number of local managers of a portion of said subset of active servers, said at least a local manager of step S1 corresponding to said number of local managers.

Preferably according to the invention, said request of availability is sent to all the servers of said subset of active sets.

Preferably according to the invention, step S1 is performer by said central manager, said at least a local manager having sent, beforehand, to said central manager the data needed to carry out the Bernoulli test.

Preferably according to the invention, step S1 is performer by said at least a local manager.

Bernoulli tests can be performed on single server. Nevertheless, an equivalent solution is that the manager performs the test instead of the single server. Namely, if the manager get hold of data on the single server state, the manager itself can perform the tests and can decide which servers are available and which ones are not. The algorithm logic does not change evidently in any manner, but the modification permits to shift the material execution of functionality (i.e. the Bernoulli test execution) from the single server to the central manager. What is important is that the test result, even if performed by the manager, depends on the use of the CPU on the single server, since this was previously transmitted from the server to the manager.

Preferably according to the invention, said determined threshold can be changed during the time on the basis of necessities.

The utilized thresholds and parameters in the probabilistic functions of the Bernoulli test (both for the assignment and for the migration) can be modified, manually or automatically, for example on the basis of the total load or criteria established each time by the system administrator. For example, one of the thresholds establishes the maximum value used by the CPU behind which the Bernoulli test have to provide a negative result. The threshold value can be fixed depending on the consolidation degree that one wants to obtain. For example, if the value of the threshold is modified from 80% to 90%, it ensues that the servers will be used more intensively, and, therefore, it will be possible to deactivate a greater number of servers, but, on the other side, a larger risk will be run that a load of a Virtual Machine could overload a server. The value of these parameters, and the manner by which they can be set up, clearly do not influence in any way the basic algorithm, that is parameterisable by its nature.

Preferably according to the invention, S1 step is performed in a continuous way spontaneously by all the servers of said subset of active sets (µ).

Preferably according to the invention, if said virtual machine to be assigned is to be transferred from a server of said subset of active servers, said pre-defined threshold is smaller, by a pre-determined real positive value Δ, than that of the case when said virtual machine to be assigned is not to be transferred from a server of said subset of active servers.

Preferably according to the invention, said probability function is defined in such a way that, if a server relevant to a local manager has a computational load smaller than a first threshold or larger than a second threshold, it tends to refuse a new virtual machine to be assigned, whilst if it has an intermediate computational load it tends to accept it, to the end of favouring said consolidation.

Preferably according to the invention, if at a given time a local manager does not have any virtual machine running on relevant local server, the latter de-activates and switches off.

Preferably according to the invention, in the step S2 said central manager chooses randomly among the elements of said list.

It is of additional specific subject-matter of the present invention, a computer program, characterised in that it comprises code means that are set up to execute, when they are made running on a elaboration electronic unit, the actions of a central manager according to the method subject-matter of the invention.

It is of further specific subject-matter of the present invention, a computer program, characterised in that it comprises code means that are set up to execute, when they are made running on a elaboration electronic unit, the actions of a local manager according to the method subject-matter of the invention.

It is further specific subject-matter of the present invention, a calculation or data centre, comprising a plurality of servers and a management central electronic unit of the calculation centre, characterised in that on each server of said plurality of servers the computer program of local server according to the invention is made running and on said management central electronic unit the computer program of central server according to the invention is made running, being further provided means for the communication and control between said management central electronic unit and the servers of said plurality of servers.

The invention will be now described by way of illustration but not by way of limitation, with particular reference to the figures of the enclosed drawings, wherein.

The present invention pursues the objective of the consolidation by means two types of statistic procedures, for the initial assignment of the Virtual Machine (VM) to the servers, and for their runtime migration.

More in details, a new VM is assigned to one of the data center servers following the execution of Bernoulli tests, i.e. statistic tests that can have as a result "true" or "false". Such tests are locally executed on the single servers, and the probability of success depends on the current use of the servers, according to provided probability functions. The server that have a low load tend to refuse new VM, so as to unload themselves and be deactivated. Similarly, the servers with high load tend to refuse new VM, this time to avoid overloading situations that can bring to performance decays and to breach of contractual agreements stipulated with the clients. On the contrary, the servers with intermediate load tend to accept new VM so to favor the consolidation.

Furthermore, the invention foresee the possibility to do migration at runtime, i.e. to transfer the VM from a server to another when this can serve to increase the consolidation or to improve performances. Also the migrations happen subsequently to Bernoulli tests, and also in this case the decisions, i.e. whether to ask the migration of a VM or accept a migrated VM, are taken on the basis of information that are locally managed on the different servers.

Figure 1:
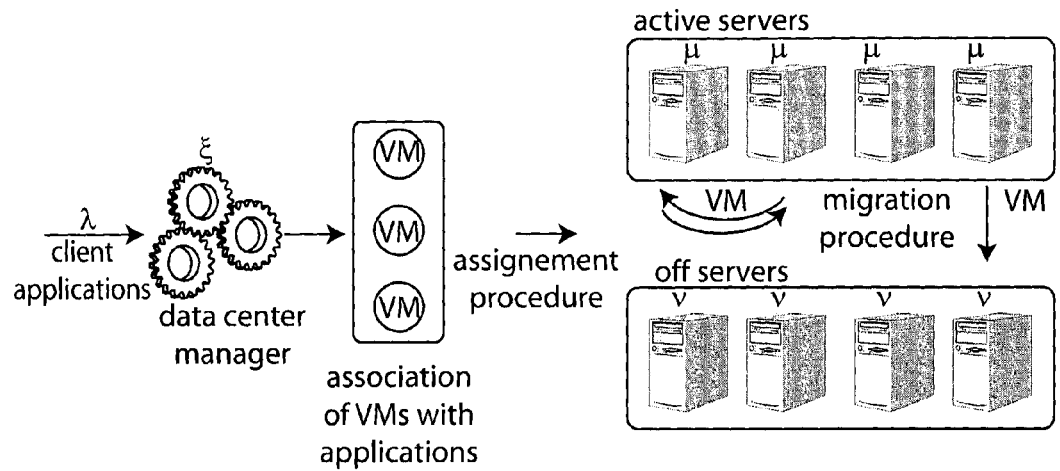
FIG. 1 shows the VM assignment and migration in a data center, according to a typical scenario in which the method of the invention is applicable.

FIG. 1 describes the reference scenario for the assignment procedure of the VM to the servers and for the VM dynamic migration procedure.

The request to carry out an application λ is transmitted from the client to the manager (or front-end) ξ of the data center, that selects a VM suitable for that type of application, on the basis of the characteristics, for example the amount of requested resources (CPU, memory, storing space) and the type of operative system specified by the client. Afterwards, the VM is assigned to one of the server by means of an assignment procedure. Such procedure, in broad terms, is defined as follows.

The front-end sends the request in broadcast (it is to note that broadcasted requests are simple and cheap for this type of environment) to all the servers or to a subset of them. Each active server executes the Bernoulli test to decide, exclusively on the basis of local information (computational load), whether to accept or not the request. The probability to accept depends on the current use of the CPU and on the maximum acceptable value for the use of the CPU (for example, 90%). The probability function is defined in such a way that the servers with small or large load tend to refuse the new VM, while the servers with intermediate load tend to accept it, to the aim of favoring the consolidation.

Figure 3:
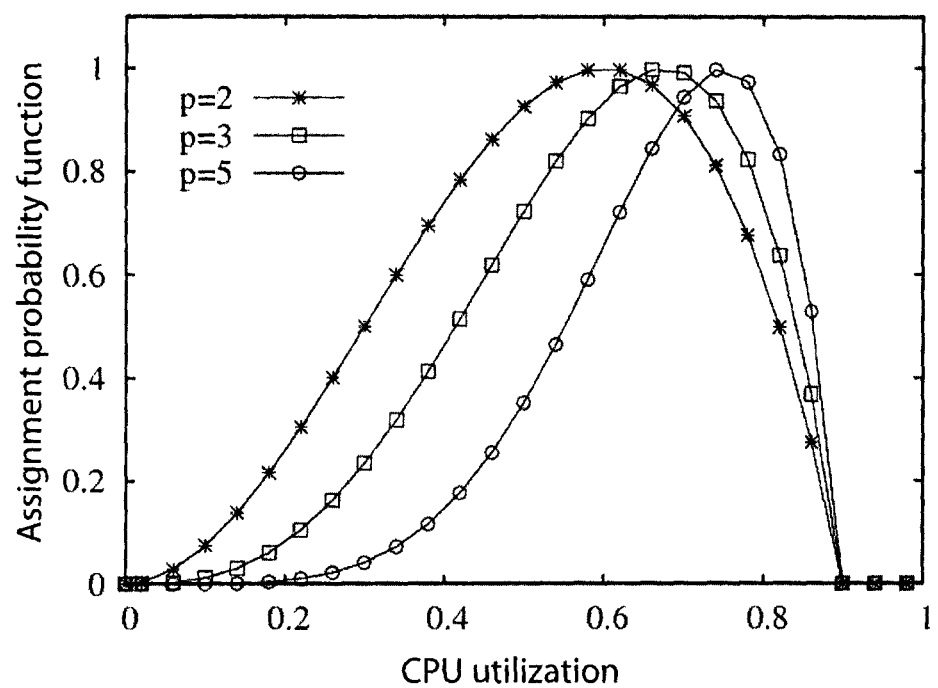
FIG. 3 shows assignment probability function examples, corresponding to different numbers of involved server, according to the present invention.

More in detail, and referring to FIG. 3, the probability function of the Bernoulli test is defined for values of CPU use in the range between 0 and the maximum acceptable value (let us suppose 90%), and assumes values between 0 and 1. To obtain the described result, the function assumes values close to 0 (low assignment probability) for values of CPU use close to the boundaries, while assumes values near 1 (high assignment probability) for intermediate values of CPU use.

After having received the reply from the different servers the front-end assigns randomly the VM to one of them, therefore without having to do any complex and centralized algorithm. If no server will declare itself free, this means that, with maximum probability, that the currently active servers are not able to support the load, and therefore a new server will be activated to which the VM will be assigned.

This is not the only possible choice. For example, the central manager could select the server that has the smallest CPU occupation (or even better larger, in view of still more loading already loaded servers), the one that has the minor memory occupation etc., the one that has been activated more recently or since more time etc. This generalization doesn't undermine in any manner the core innovative idea, that is to make possible the single servers to decide whether to provide their availability, after having performed a Bernoulli probabilistic test with true/false outcome. It is important to note in fact that it remains the central manager obligation to contain its selection within the server group that have declared to be available. It is this obligation that guarantees the scalable behavior of the algorithm. The possible additional criterion used to do the choice doesn't undermine the global behavior and the data center performances, but can be useful for satisfying secondary constrains, as a function of the needs and the system administrators requests.

As far as the migration is concerned, it is important to note that the VM load is highly variable, thinking for example to the case of a VM that hosts a server Web of a client. Therefore, also as a consequence to an optimal assignment, the load variations can require the online migration of the VM from one server to the other.

The migration procedure is preferably started locally by the single server, at the moment in which it records its own load too small (and therefore it would be better to completely unload the server so to be able to deactivate it) or too large. When a server decides to make a VM able to migrate, it performs a statistical procedure similar to assignment one, changing only the probability function of the Bernoulli test slightly. More deeply in details, the variation regards the definition of the maximum acceptable value for the use of the CPU, value that is slightly lower (for example of 10%) than the one in the assignment procedure. This is useful to guarantee that, in case of migration due to an overload, the VM migrates towards a server with an effectively smaller load, so as to avoid a new immediate migration caused by overload.

The energy saving is based on the possibility to switch on or off the servers of the data center as a function of the requests load, taking into consideration the double objective of minimizing the number of switched-on servers and maximising the quality of the service ("Quality of Service", QoS).

Figure 2:
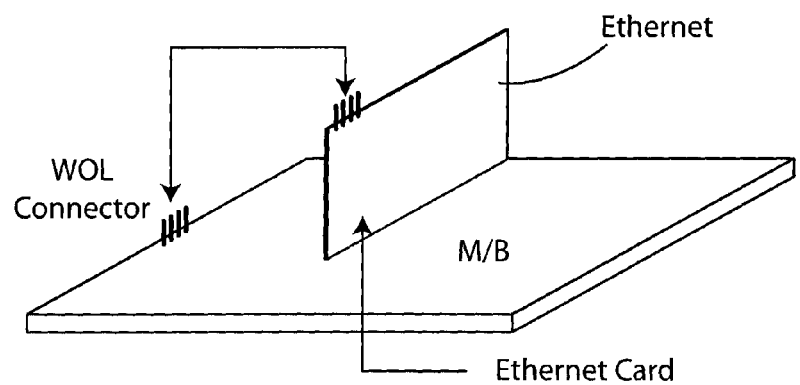
FIG. 2 shows a connection for the remote switching on/off of a server, according to the well-known technique named "Wake On LAN" (WON)

Referring to FIG. 2, the switching-off of a server can be decided from the local manager that runs on the single server on the basis of the load, and occurs by means a shutdown command. Whilst the switching-off of a server can be executed locally via software, the switching-on by remote control requires the support of the hardware. Such a support is provided by the Wake on LAN (WOL) network interface cards, based on an Ethernet standard that permits to start a computer in standby from a remote station, provided that the MAC address is known, by sending to the LAN the so-called Magic Packet. The computer MainBoard (M/B) at issue has to be provided with an appropriate connection (named WAKEUP-LINK) and has to be connected to the network interface card by means of a special cable. However, since few years, if both the mainboard and the network interface card support the PCI standard 2.2, in general the cable is not necessary as, also in case of a switched-off computer, the PCI slots are powered with a standby voltage. With the introduction of the PCI release 2.2, in fact, the support to PME (Power Management Events) is added, so that the PCI cards could exchange signals even when the computer is switched off.

From the point of view of software, the invention includes two fundamental components, one for the system manager and one for the single server. The software is developed in a plurality of program languages (C, Java) and in different versions in order to adapt itself to the different types of data center (Eucalyptus, VMWare, Amazon etc.).

The central manager software performs, in an embodiment, the following functionalities:
1. Sending in broadcast the request to accept a VM;
2. Randomly selecting (or according to another criterion of advantage, as above specified), between the available servers, the one that will have to allocate the VM;
3. In the case that no server is available, activating a new server and asking to it to allocate the VM.

The single server software manages the monitoring of the local load, and to provide the essential primitives to the platform (central manager), i.e.
1. Activating the local server further to the request of the manager;
2. Switching off the local server when there are no active VM;
3. Replying in broadcast to the requests and declaring its availability to accept a VM, on the basis of the local load;
4. Allocating a VM upon request of the manager;
5. Requesting the migration of a VM (or, depending on the versions, delegating this activity to the manager).

The system can integrate itself with the existing Cloud platforms, for example with "Elastic Compute Cloud" (EC2) of Amazon, a service of IaaS ("Infrastructure-as-a-Service") type based on the XEN virtualization technology. By the integration of the manager with the VM management instruments of EC2 (EC2ool), it is possible to implement the functionalities necessary to the manager.

Example of Assignment Procedure

A client requests the execution of an application at the front-end, that associates the application to a VM. The front-end (central manager) sends the request in broadcast to the servers, requesting them if they are available to execute the VM. Each server evaluates the local utilisation of the CPU, and carries out a Bernoulli test to decide whether to make itself available or not.

For example, a server with low use of the CPU (let us suppose 10%), evaluates the probabilistic function of assignment in FIG. 3 that, considering the low load, will assume a low value, for example 0.03.

At this point, it is necessary to perform the Bernoulli test. Therefore, one extracts a random number between 0 and 1 (or equivalently between 0 and 100, being a probability); if this extracted value is smaller than 0.03, then the server will declare itself available.

This means that, following the Bernoulli test, only with the 3% of probability the server will make itself available for executing the VM. On the contrary, a server with an intermediate load (supposing 60%), will calculate a much larger value of the assignment function: for example, the value could be 0.95, that means that the server will make itself available at 95%. After having received the availability declarations, the front-end will select randomly a server between all the available servers, and will assign it the VM.

Example of Migration Procedure

The migration procedure can be started in a deterministic manner (for example, if the server realises that its load is lower or higher than a threshold) or following a probabilistic test. The migration can then be done in two ways: the server itself can send the request in broadcast to other servers, or the server can assign the procedure to the front-end, similarly to what occurs in the assignment procedure. The servers decide whether to accept the "migrating" VM still further to a Bernoulli test, analogously to what previously seen, and the entity which has sent the invitation (the front-end or the starting server) chooses randomly among the servers that have made themselves available. The probability function is similar to the one used for the assignment, but in the case of migration caused by the overload it is modified in such a manner that the VM will have to migrate towards a server with a CPU use lower than the one of the starting server.

A possible variation for the two procedures is that the invitation is not sent in broadcast for each VM to be assigned/migrated, but the single server, regularly or following local specific events (for example a significant load variation), communicate spontaneously to the front-end their availability to accept a VM, always further to a Bernoulli test. Therefore, the servers do not wait for the invitation, but spontaneously offer themselves, so that the front-end can perform the assignment, or complete the migration, already knowing which servers are available.

Advantages of the Invention

All the approaches for the consolidation of virtual machines, to our knowledge, are based on approaches that present some important problems. First of all, they are based on centralized algorithms, which, on the basis of the collected information over the whole data center, try to distribute in an optimal way the VM on the different servers. The problem is that the optimal assignment is a typical problem of "bin packing", that has a NP-hard complexity, i.e. the execution times are exponential with respect to the number of server and of VM. Of course heuristic algorithms exist, for example based on the method of integer programming or the VM sorting according to their load requests, but these algorithms can approach the optimal solution only within a margin of about 20%. Moreover, what is more important, these solutions require that the central manager is constantly updated about the load of all the servers and of all the applications, what is very problematic in dynamic environment with tens, hundreds or even millions of servers. This is certainly a non-scalable approach.

Another important difficulty is that the algorithms described in literature requires the periodic re-assignment of many VM, and therefore their simultaneous migration. These can easily bring to a huge performances degradation, and consequently to the risk that the contractual obligations with the clients cannot be respected.

With respect to what has been described according to the present invention, there are at least three important advantages:

1. Thanks to the statistical approach, the solution according to the present invention is scalable, indeed it is even "over-scalable", i.e. more than scalable, in the sense that it is as more efficient as the data center is larger. In particular, our tests show that, starting from 80 servers, it is possible to approach the ideal solution within a margin of no more than 3%, and results are even better for larger data center.

2. The solution according to the present invention is decentralised, meaning that the intelligence (for example the decision whether to accept a new VM or whether to request a migration) is in the single server and not in the central manager. In particular the latter does not have the necessity to collect updated information on the different servers, but has only to send some requests in broadcast and then randomly choose among the servers that have declared to be available for accepting a VM.

3. The solution according the present invention request the continuous, gradual and asynchronous migration of the VM. It is never necessary to contemporarily migrate different VM. This approach has a lot of advantages concerning the performances decay tied to the migrations themselves.

The invention can be used for the energy saving on data center of medium-large dimensions, i.e. having from some tens of servers up to some hundreds or millions of di servers.

The reference market is enormous. In the following, numbers of data center servers of some IT large companies operating in the sector of the Cloud Computing are reported:

Intel: 100,000 servers (data of February 2010);
SoftLayer: 81,000 servers (data of May 2011);
OVH: 80,000 servers (data of November 2010);
Akamai Technologies: 73,000 servers (data of November 2010);
Rackspace: 70,473 servers (data of May 2011)
1&1 Internet: 70,000 servers (data of February 2010);
Facebook: 60,000 servers (data of October 2009);
LeaseWeb: 36,000 servers (data of February 2011);
SBC Communications: 29,193 servers (estimate of Netcraft);
Verizon: 25,788 servers (estimate of Netcraft);
Time Warner Cable: 24,817 servers (estimate of Netcraft);
AT&T: 20,268 servers (estimate of Netcraft);
Google: over 450,000 servers (conservative estimate of 2011);
Microsoft: over 500,000 servers (conservative assessment of 2011);
Amazon: 40,000 servers (conservative estimate of 2011);
eBay: over 50,000 (estimate of 2011);
Yahoo: over 50,000 (estimate of 2011);
HP: over 380,000 (estimate of 2011);
IBM: over 50,000 (estimate of 2011).

It is calculated that in Italy there are about 3,000 data centers. In this context, there are also extreme cases ranging from small data center of a local administration to over 15 data centers of Internet providers.

A study of Oracle of May, last (http://www.cwi.it) identifies four steps of this transformation: silos, consolidation, optimisation (integration of the different layers) and finally Cloud. The average Italian data center is between first and second step, between silos and consolidation. This means that the great part of the Italian companies appear far away from the possibility to completely exploit the value of its own IT resources.

Examples how Italian data center appear far away from the maximum efficiency, are the following: more than 75% delivers on average less than 50% of the total available power; more than 30% of the structures does not have automatic procedures of system management, what determines the use of a lot of resources and low flexibility.

But the probably more striking data refer to the virtualisation and environmental sustainability. About 40% of the companies has admitted that it has vitualised less than 10% of the hardware servers present in the data center, and another abundant 20% between 10 and 0.29% of the servers.

It appears the necessity of a change for the Italian companies. Due to the problems generated by complex and inefficient infrastructures, according to Oracle, 61% of the companies foresee the necessity to implement a new structure of data center within the next two years.

With "new structure" it is to be intended a completely managed or also externalized data center. The 55% of Italian companies has only one in-house data center. The 23% has some in-house data centers and no external one. The 15% has a mix composed by a main internal data center plus some external ones. Finally 7% has a mix of some in-house data centers plus some external ones.

Moreover, as far as the development of Cloud Computing is concerned, it has to be taken into consideration that on the side of a lot of companies there is most of all an interest to "Private Cloud" services. It deals with specific IT environments wherein access and sharing are private. A private Cloud can be either in the company itself, or hosted by an external provider. There is also the "hybrid" Cloud, which combines the external IT services, i.e. provided by specialised companies, with others directly managed by the client. The typical behaviour of the companies is in general to observe a prudent approach: they start from the private Cloud and only subsequently they arrive to external and hybrid systems. This entails that the energy saving problem is important not only for specialised companies but also for the management of the data centers of the companies that entrust themselves to private Cloud Computing system.

As far as Italy is concerned, it is foreseen that the business volume for the next twelve months will be of 287 million of euro. A recent research of Nextvalue (Cloud Computing Report, April 2011) estimates that 61% of the big Italian companies (and 80% in Europe) has adopted or will adopt in the next twelve months projects of Cloud Computing. As far as the PMI are concerned, a report of the School Of Management of "Politecnico di Milano", presented in May, discloses that the diffusion level of Cloud in small and media companies is still of the order of 2-3%, but a huge growth is foreseen. The expectations of the companies with respect to Cloud are very high and regard firstly the limitation of hardware and staff costs, and secondly the activation rate and the flexibility.

REFERENCES

[Bel11] Anton Beloglazov, Rajkumar Buyya, Young Choon Lee, Albert Y. Zomaya: A Taxonomy and Survey of Energy-Efficient Data Centers and Cloud Computing Systems. Advances in Computers 82: 47-111 (2011)

[Buy09] Rajkumar Buyya, Chee Shin Yeo, Srikumar Venugopal, James Broberg, and Ivona Brandic. Cloud computing and emerging it platforms: Vision, hype, and reality for delivering computing as the 5th utility. Future Generation Compututer Systems, 25(6):599-616, June 2009.

[Bel10] Anton Beloglazov and Rajkumar Buyya. Energy efficient allocation of virtual machines in cloud data centers. In 10th IEEE/ACM Int. Symp. on Cluster Computing and the Grid, CCGrid 2010, pages 577-578, 2010.

[Bar07] Luiz André Barroso and Urs Holzle. The case for energy-proportional computing. IEEE Computer, 40(12): 33-37, December 2007.

[Gre09] Albert Greenberg, James Hamilton, David A. Maltz, and Parveen Patel. The cost of a cloud: research problems in data center networks. SIGCOMM Comput. Commun. Rev., 39(1):68-73, 2009.

[Ver08] Akshat Verma, Puneet Ahuja, and Anindya Neogi. pMapper: Power and migration cost aware application placement in virtualized systems. In Valrie Issarny and Richard E. Schantz, editors, Middleware 2008, ACM/IFIP/USENIX 9th International Middleware Conference, Leuven, Belgium, Dec. 1-5, 2008, Proceedings, volume 5346 of Lecture Notes in Computer Science, pages 243-264. Springer, 2008.

[Sti09] M. Stillwell, D. Schanzenbach, F. Vivien, H. Casanova, Resource allocation using virtual clusters, in: Proceedings of the 9th IEEE/ACM International Symposium on Cluster Computing and the Grid (CCGrid 2009), Shanghai, China, 2009, pp. 260-267.

[Yue91] Minyi Yue. A simple proof of the inequality FFD $(L) \leq 11/9$ OPT $(L)+1$, for all L for the FFD bin-packing algorithm. Acta Mathematicae Applicatae Sinica, 7(4):321-331, 1991.

[Maz10] Michele Mazzucco, Dmytro Dyachuk, and Ralph Deters. Maximizing cloud providers' revenues via energy aware allocation policies. In 10th IEEE/ACM Int. Symp. on Cluster Computing and the Grid, CCGrid 2010, pages 131-138, 2010.

In the foregoing, preferred embodiments of the disclosure have been described and some variations of the present invention have been suggested. Nevertheless, it will be understood that those skilled in the art will be able to make modifications without departing from the spirit and scope of the present disclosure, as defined by the enclosed claims.

The invention claimed is:

1. A method for assigning application-hosting virtual machines to a plurality of servers in a data or calculation center, the plurality of servers comprising active servers and inactive servers, the method comprising:
    providing a central manager and local managers of the data or calculation center, each local manager being assigned to a corresponding server of the plurality of servers;
    performing a Bernoulli test on at least one active server based on a probability function, the probability function depending on a calculation resource occupation value of the at least one local manager corresponding to the at least one active server and being zero for calculation resource occupation values of the at least one local manager higher than a set threshold;
    based on the Bernoulli test performed on the at least one active server, establishing availability or lack of availability of the at least one active server to accept assignment of a virtual machine;
    forming, by the central manager, a list of available active servers;
    if the list of available active servers contains at least one available active server, the central manager selecting from the at least one available active server an active server to which a virtual machine is to be assigned and assigning the virtual machine to the selected active server, thus configuring the selected active server to run applications hosted by the assigned virtual machine;
    if the list of available active servers contains no available active servers, the central manager activating a server from the inactive servers and assigning the virtual machine to the activated server, thus configuring the selected activated server to run applications hosted by the assigned virtual machine; and
    the central manager deactivating an active server if at a given time the active server has no running virtual machines, the deactivated active server thus becoming an inactive server.

2. The method of claim 1, wherein the Bernoulli test is performed by the at least one local manager.

3. The method of claim 2, wherein the Bernoulli test is performed by the at least one local manager upon controlling satisfaction of one or more conditions.

4. The method of claim 3, wherein the one or more conditions include random access memory (RAM) occupation or disc use below a certain threshold.

5. The method of claim 1, wherein, before the Bernoulli test, the central manager broadcasts a request of availability to host a virtual machine to local managers assigned to the active servers or a portion thereof.

6. The method of claim 1, wherein the Bernoulli test is performed by the central manager.

7. The method of claim 6, wherein the Bernoulli test is performed by the central manager upon receipt of data for performing the Bernoulli test from the at least one local manager.

8. The method of claim 1, wherein the set threshold is a time-varying threshold.

9. The method of claim 1, wherein the performing the Bernoulli test on at least one active server is automatically and continuously executed by the active servers.

10. The method of claim 1, wherein the establishing availability of the at least one active server to accept assignment of a machine is based on a first threshold, while the establishing lack of availability of the at least one active server to accept assignment of a machine is based on a second threshold greater than the first threshold.

11. The method of claim 10, wherein difference between the second threshold and the first threshold is a set positive value.

12. The method of claim 1, wherein the probability function is defined so that if the at least one active server has a computational load lower than a first threshold or higher than a second threshold then lack of availability is established, while if the at least one active server has a computational load higher than the first threshold and lower than the second threshold then availability is established.

13. The method of claim 1, wherein the central manager randomly selects from the at least one available active server an active server to which a virtual machine is to be assigned.

14. A non-transitory storage medium comprising a computer program, the computer program executing the following steps when running on a computer:
   in a data or calculation center with a plurality of servers comprising active servers and inactive servers, forming a list of active servers available to accept assignment of a virtual machine, availability of the active servers being established based on a Bernoulli test, the Bernoulli test being based on a probability function, the probability function depending on a calculation resource occupation value and being zero for calculation resource occupation values higher than a set threshold;
   if the list of available active servers contains at least one available active server, selecting from the at least one available active server an active server to which a virtual machine is to be assigned and assigning the virtual machine to the selected active server, thus configuring the selected active server to run applications hosted by the assigned virtual machine;
   if the list of available active servers contains no available active servers, activating a server from the inactive servers and assigning the virtual machine to the activated server, thus configuring the selected activated server to run applications hosted by the assigned virtual machine; and
   deactivating an active server if at a given time the active server has no running virtual machines, the deactivated active server thus becoming an inactive server.

15. The non-transitory storage medium of claim 14, wherein the computer program further executes the Bernoulli test when running on the computer.

16. A non-transitory storage medium comprising a computer program, the computer program executing the following step when running on a computer:
   in a data or calculation center with a plurality of servers comprising active servers and inactive servers, performing a Bernoulli test on one or more of the active servers to determine availability of the one or more active servers, the Bernoulli test being based on a probability function, the probability function depending on a calculation resource occupation value and being zero for calculation resource occupation values higher than a set threshold.

17. A calculation or data center comprising:
   a plurality of servers comprising active servers and inactive servers; and
   a management central electronic unit comprising a computer program, the computer program executing the following steps when running on the management central electronic unit:
   forming a list of active servers available to accept assignment of a virtual machine, availability of the active servers being established based on a Bernoulli test, the Bernoulli test being based on a probability function, the probability function depending on a calculation resource occupation value and being zero for calculation resource occupation values higher than a set threshold;
   if the list of available active servers contains at least one available active server, selecting from the at least one available active server an active server to which a virtual machine is to be assigned and assigning the virtual machine to the selected active server, thus configuring the selected active server to run applications hosted by the assigned virtual machine;
   if the list of available active servers contains no available active servers, activating a server from the inactive servers and assigning the virtual machine to the activated server, thus configuring the selected activated server to run applications hosted by the assigned virtual machine; and
   deactivating an active server if at a given time the active server has no running virtual machines, the deactivated active server thus becoming an inactive server.

18. The calculation or data center of claim 17, wherein the computer program further executes the Bernoulli test when running on the computer.

19. The calculation or data center of claim 17, wherein at least one active server comprises a computer program, the computer program executing the Bernoulli test and communicating the result to the management central electronic unit.

20. The calculation or data center of claim 17, wherein at least one active server communicates to the management central electronic unit data for performing the Bernoulli test.

* * * * *